Figure 1:
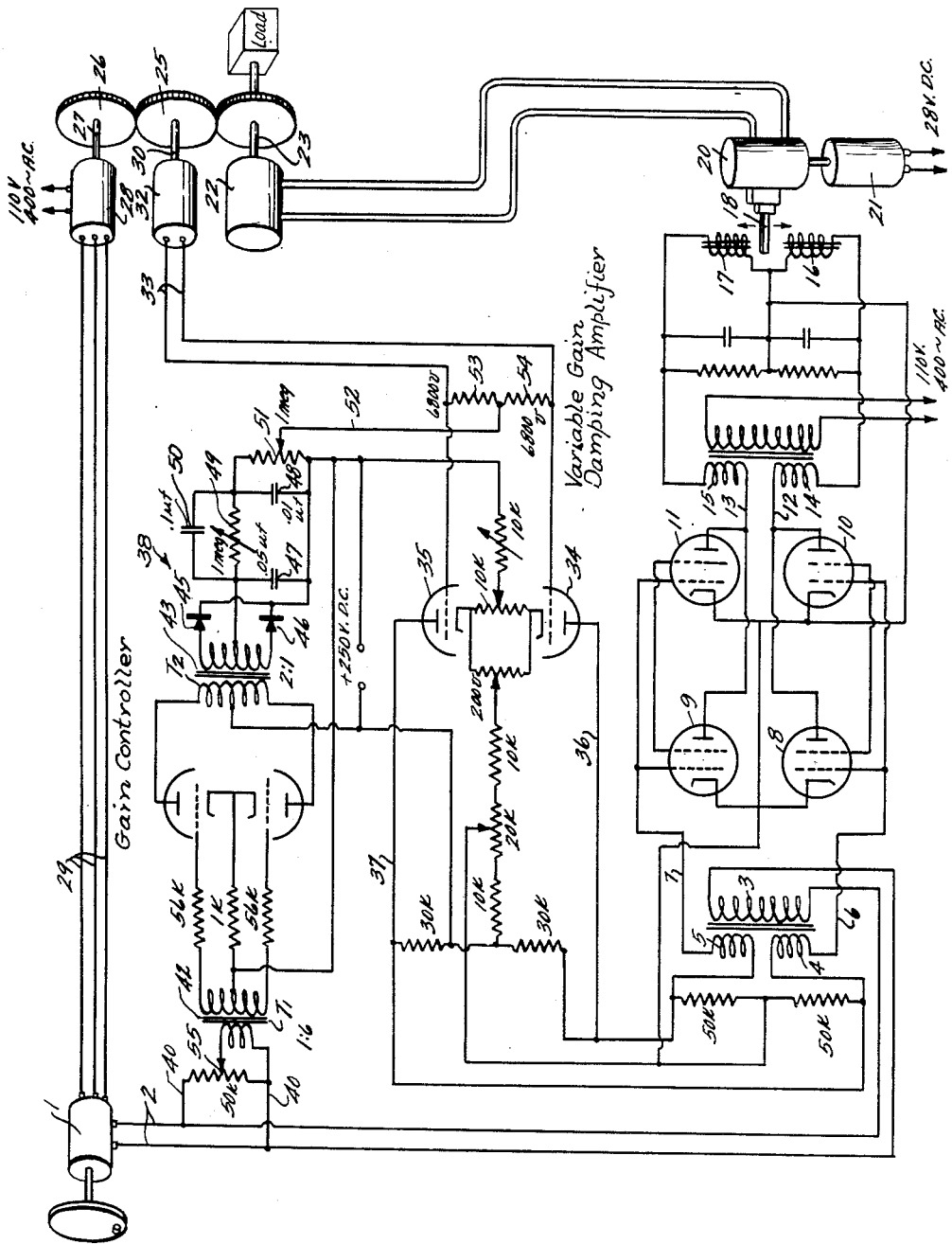

Oct. 13, 1953

R. I. BERGE 2,654,999

CONTROLLED DAMPING SERVO MECHANISM

Filed June 19, 1951

2 Sheets-Sheet 1

INVENTOR.
RALPH I. BERGE
BY Theodore C. Wood
AGENT
Wade Koontz
ATTORNEY

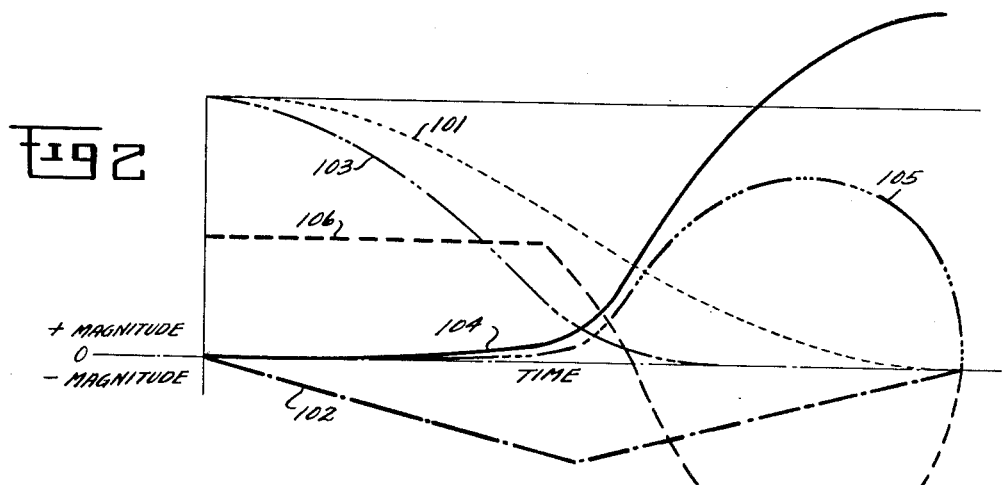
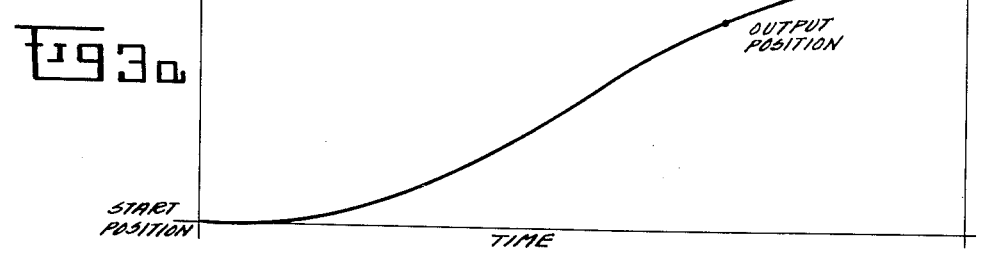
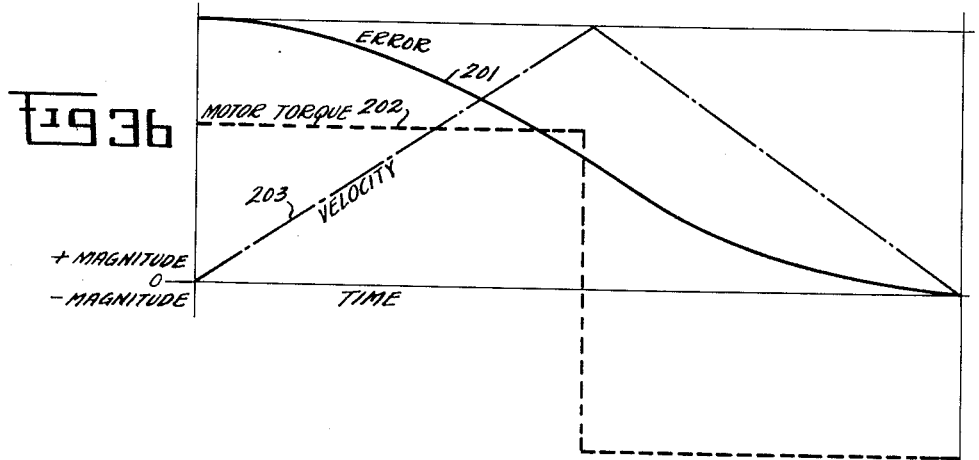

Patented Oct. 13, 1953

2,654,999

UNITED STATES PATENT OFFICE 2,654,999

CONTROLLED DAMPING SERVO MECHANISM

Ralph I. Berge, Dayton, Ohio

Application June 19, 1951, Serial No. 232,438

4 Claims. (Cl. 60—53)

(Granted under Title 35, U. S. Code (1952), sec. 266)

The invention described herein may be manufactured and used by or for the Government for governmental purposes without payment to me of any royalty thereon.

This invention relates to servomotor systems, and in particular to improvements in servomotor systems of the type having damping or stabilizing means which is a function of speed or the rate of change of position of the servomotor.

In the art of servomotor systems a very serious problem exists which is a result of inertia and friction in the system that causes the servomotor to oscillate or hunt. Many arrangements for preventing hunting have been proposed, however, all such proposed systems known to me produce another very objectionable problem which is that although they reduce or eliminate hunting, the servomotor is caused to lag and the amount of lag is so appreciable as to become objectionable.

In the prior art, one type of proposed system has been found to be very desirable. In that system a damping signal is fed into the control circuit of the servomotor which signal is in a sense opposing the error signal, and since this damping signal is a function of speed of the servomotor, the amount of oscillation or hunting in that system is appreciably less than in many other types of systems. This type of damping is known in the art as "rate damping."

An object of this invention is to reduce the amount of lag in a servomotor system while still substantially eliminating hunting.

Another object of this invention is to provide an electronic control arrangement whereby the damping signal which is a function of speed of the servomotor is modified in accordance with a signal which is a function of the amount of error.

For a more complete understanding of the invention reference may be had to the accompanying drawings, in which: Fig. 1 is a schematic drawing illustrating the servomotor system of my invention and Fig. 2 illustrates graphically the operation of the system.

Fig. 3A is a graph representing the instantaneous position of a servomotor when the motor position is changed from one operating condition to another operating condition. Fig. 3B illustrates the motor torque, velocity and error during the condition change illustrated in Fig. 3A.

Referring now to Fig. 1 of the drawing. The system comprises a selsyn transformer 1, the displacement of the rotor of which by the input shaft represents the movement to be reproduced at a remote point; that is, the selsyn transformer 1 may represent an element such as a reluctance pick-off in an autopilot, or any error measurement means capable of generating a voltage signal proportional to an existing error which is to be corrected. Rotation of the rotor in the selsyn or synchro-transformer 1 creates a voltage in the output leads 2 proportional to the displacement of the rotor relative to the magnetic field produced by the stator and this voltage is the error signal or control signal. The error signal is applied to the primary of a transformer 3, the secondary windings 4 and 5 of which are in turn connected by means of conductors 6 and 7 to the grids of tubes 8, 9, 10, 11 which form a conventional servoamplifier. The error signal is amplified by tubes 8, 9, 10, 11 and the amplified output signal appearing on leads 12 or 13 in the form of an alternating current is fed to coils 16 and 17 of a relay or which may, for example, comprise the windings of a two phase reversible A. C. motor. Relay windings 16 or 17, whichever has the predominant current flowing therein actuate the control member 18 of a variable displacement hydraulic oil pump 20 which is constantly driven by electric motor 21. The output of pump 20 is fed to a reversible constant displacement oil motor or servomotor 22 which drives an output shaft 23 adapted to be connected to any desirable load such as the actuation of an aircraft control service or the like. Gear 24 is mounted on shaft 23 and drives an intermediate gear 25 and a final gear 26 which has its shaft 27 connected to a selsyn or synchogenerator 28 so as to feed back a signal by means of conductors 29 to synchro or selsyn transformer 1 tending to cancel the signal created by initial displacement of the input member of the transformer 1.

When the oil synchro motor 22 has displaced the load by an amount proportional to the displacement of the input member of the selsyn 1, the feedback signal from the synchro 28 will have just canceled the error signal appearing in the lead 2.

The intermediate gear 25 drives a shaft 30 which in turn drives a D. C. tachometer generator 32 adapted to feed a D. C. signal on leads 33 to superimpose the same as grid bias on the error voltage applied to the grids of tubes 8 and 9 from the secondary 4 and 5. The function of the tachometer generator is to furnish a supplemental feedback signal which is a function of the speed at which the oil servomotor operates and tends to bring the system into equilibrium shortly prior to the time that synchro generator 28 will have fully canceled the original error signal so that the final equilibrium position of the control load object will be approached gradually and prevent overshooting which results in hunting.

The system so far described is conventional and is known as a servomotor system having "rate damping." The formula of operation of the so far described system is as follows:

$$J\frac{d^2\theta_o}{dt^2}+F\frac{d\theta_o}{dt}+K\theta_o=\theta_i$$

in which:

J is inertia
$\theta_o$ is output
$\theta_i$ is input
F is a constant proportional to friction the damping factor of the above formula is $$F\frac{d\theta_o}{dt}$$

and therefore the time necessary for the system to arrive at a new state of equilibrium is appreciable.

The system of this invention provides in addition to the above described system a variable gain damping amplifier whose gain is controlled as a function of the error signal by a gain controller. More particularly the gain controller generally illustrated at 38 comprises leads 40 connected to the error signal leads 2 such that the error signals are developed across the primary of transformer 42 the output of which is fed to the grids of a vacuum tube type 6SN7 the plate current of which is fed to transformer 43 the output of which is rectified by rectifiers 45, 46 and is then filtered by condensers 47, 48, resistors 49, 51, and condenser 50. The D. C. output of the gain controller is then fed through conductor 52 to dropping resistors 53 and 54 and thus furnishes a D. C. bias on the tube 6SL7 of the variable gain damping amplifier.

The formula of operation of a servo system of my invention is as follows:

$$J\frac{d^2\theta_o}{dt^2}+\left(\frac{1}{a+b|E|+c\frac{d|E|}{dt}}\right)\frac{d\theta_o}{dt}+K\theta_o=\theta_i$$

in which:

J is inertia
$\theta_o$ is the output
$a, b, c$ and K are constants
$|E|$ is the magnitude of error
$\theta_i$ is input in the above equation the second term, namely, $$\left(\frac{1}{a+b|E|+c\frac{d|E|}{dt}}\right)\frac{d\theta_o}{dt}$$

is called the damping factor.

The constant $a$ in the damping factor is a limiting constant of the system and need not be further described. The constants $b$ and $c$ of the damping factor may be adjusted by varying the resistors 55 and 51. Proper proportions of constants $b$ and $c$ gives optimum response for any given size transient error and provides best continuous servo response for combinations of transients such as two transients varying in direction. The term $|E|$ of the above equation is obtained in the circuit of my invention by rectifying and filtering the error signal. In the illustrated embodiment of my invention in Fig. 1 the rectifiers 45, 46 and the filter network comprising condensers 47, 48 and resistor 49 produce across the load resistor 51 a signal represented by $|E|$ of the above equation. In order to obtain the expression $$\frac{d|E|}{dt}$$

the system of my invention incorporates a condenser 50 which in combination with the load resistor 51 produce a signal having the characteristics of that expression. The two voltages thus obtained from the gain controller are used to vary the bias of the variable gain damping amplifier.

The biasing voltage produced by the gain controller when the servomotor is operating to correct a difference between output and input is more clearly shown in Fig. 2 wherein the curve 101 represents the voltage $|E|$ produced by the rectifiers 45, 46 and the filter network. The curve 102 represents the voltage $$\frac{d|E|}{dt}$$

obtained by the lead network consisting of condenser 50 and resistor 51 and curve 103 represents the output of the gain controller which is the sum of the voltages represented by curves 101 and 102. Curve 104 represents the gain of the tube 6SL7 as a result of the bias produced thereon by the output of the gain controller. Curve 105 represents the voltage at the output of the variable gain damping amplifier which is a result of the input signal from the tachometer generator being amplified by the tube 6SL7 whose bias is varied by the output of the gain controller. The torque produced by the motor during the time that the motor is correcting the difference between the output and input is illustrated by curve 106. The flat tops of curve 106 are the maximum torque of a given motor.

Since the servomotor is controlled by the servo amplifier which will greatly amplify the error signal when the error is large and will amplify to a lesser extent when the error is small as a result of the damping voltage produced at the output of the variable gain damping amplifier, the state of equilibrium will be reached without overshooting which would result in oscillation. Furthermore, due to the non-linear effect of the damping amplifier the state of equilibrium will be reached in a minimum of time.

In order to more clearly understand this invention an idealized servomotor system will be considered. In Fig. 3A the instantaneous output position of a motor is shown when the servomotor is changing from one position (start position) and another position (destination position) to correct an error between the output position of the motor and the input to the system. In Fig. 3B curve 201 represents the magnitude of error between the output and input of the servomotor system. In a servomotor system wherein the maximum value of torque of the motor and the inertia load on the motor are fixed, error is eliminated most rapidly when the motor torque varies as illustrated in curve 202 and system inertia fixes velocity to vary as curve 203. It would be ideal in a servomotor system if the motor torque would have a value such as that illustrated by curve 202 of Fig. 3B and a velocity such as that illustrated by curve 203 of Fig. 3B. It is the purpose of this invention to provide a system which will have operating characteristics resembling an idealized servomotor system as nearly as possible.

By comparing the motor torque curve illustrated by curve 106 of Fig. 2 (in a system of my invention) and the curve 202 of Fig. 3B which illustrates the motor torque of an idealized servomotor system it will be apparent that the system of my invention produces operating characteristics of the servomotor which are highly desirable.

In the drawing has been shown particular values of the various circuit elements of the gain controller, the variable gain damping amplifier and the servo amplifier. These values are representative of a preferred embodiment of this invention and are not to be construed as limiting.

Although a specific variable gain damping amplifier has been shown and described it is to be understood that this is merely representative of any unit which has the characteristics of varying the magnitude of the output of the tachometer generator in accordance with a variable D. C. voltage. The amplifier may in fact have an amplification factor of less than 1 or more than 1 dependent upon the particular system employed. Furthermore, the gain controller is merely representative of any unit capable of producing a voltage which is a function of the error signal.

I claim as my invention:

1. In a servomotor system having means responsive to a condition to be controlled for producing a control signal, servo amplifier means responsive to said control signal to produce an amplified control signal, servomotor means responsive to said amplified error signal to control said condition and damping generator means responsive to the rate of change of position of said servomotor to vary the effect of said control signal upon said servomotor, an improved means to reduce lag in the servomotor system comprising; a variable gain amplifier having means to connect its input to the output of said damping generator and having means to connect its output to the input of said servo amplifier, an electron tube having means to connect its grid to respond to the control signal, rectifier means to rectify the output of said electron tube, said rectifier means having an output circuit including a resistor and condenser whereby a voltage which is a function of the magnitude and the rate of change of magnitude of said control signal is produced, and circuit means to connect said rectifier output circuit to the control circuit of said variable gain amplifier.

2. A servomotor system comprising; a synchro transformer, means to cause the rotor of said synchro transformer to be moved in accordance with an input shaft, a synchro generator, a servomotor, means to couple the output of said servomotor to the rotor of said synchro generator, means to energize the stator of said synchro transformer by the voltage produced by said synchro generator, said transformer having an output circuit having a voltage proportional to the displacement of its rotor relative to the magnetic field produced by its stator, a first electronic amplifier having its ouput connected to the control circuit of said motor and its input connected to said output circuit of said synchro transformer, a direct current generator, means to couple the output of said servomotor to said direct current generator, a second electronic amplifier having its input circuit connected to the output of said direct current generator and its output connected to the input circuit of said first electronic amplifier and a gain controller for said second electronic amplifier, said gain controller comprising an electron tube having its input connected to said output circuit of said synchro transformer and its output circuit connected to the input circuit of said second electronic amplifier through a circuit including a rectifier and a resistance-capacitor network.

3. In a servomotor system having means responsive to a condition to be controlled for producing a control signal, servo amplifier means responsive to said control signal to produce an amplified control signal, servomotor means responsive to said amplified control signal to control said condition and damping generator means responsive to the rate of change of position of said servomotor to vary the effect of said control signal upon said servomotor, an improved means to reduce lag in the servomotor system comprising; a variable gain amplifier having means to connect its input to the output of said damping generator and having means to connect its output to the input of said servo amplifier, and means responsive to the magnitude of said control signal and to the rate of change of magnitude of said control signal to vary the gain of said variable gain amplifier.

4. A servo system comprising; a controlling object, a controlled object to be kept in positional agreement with said controlling object, means for producing an error signal proportional to the positional disagreement between said controlling object and said controlled object, a servo amplifier having an input and an output, means to apply said error signal to said input of said servo amplifier, a servomotor, means to apply the output of said servo amplifier to said servomotor, means to produce a damping signal proportional to the rate of change of position of said servomotor, a variable gain amplifier having an input and an output, means to apply said damping signal to said input of said variable gain amplifier, means to apply said output of said variable gain amplifier to said input of said servo amplifier and means to vary the gain of said variable gain amplifier as a function of the magnitude and rate of change of magnitude of said error signal.

RALPH I. BERGE.

References Cited in the file of this patent

UNITED STATES PATENTS

| Number | Name | Date |
|---|---|---|
| 2,040,014 | Moseley | May 5, 1936 |
| 2,408,068 | Hull et al. | Sept. 24, 1946 |
| 2,528,017 | Stanton | Oct. 31, 1950 |

OTHER REFERENCES

"Servomechanism Fundamentals," by Lauer, Lesnick, Matson, McGraw-Hill Book Company, 1947, pages 100–102.